United States Patent [19]
Owen

[11] Patent Number: 5,280,501
[45] Date of Patent: Jan. 18, 1994

[54] DATA BIT SYNCHRONIZATION

[75] Inventor: Jeffrey R. Owen, Portland, Oreg.

[73] Assignees: Seko Corp.; Seiko Epson Corp., both of Japan

[21] Appl. No.: 594,583

[22] Filed: Oct. 9, 1990

[51] Int. Cl.$^5$ .............................................. H04L 27/06
[52] U.S. Cl. ...................................... 375/94; 375/119
[58] Field of Search ..................... 375/52, 57, 83, 94, 375/95, 99, 119, 120, 115, 49, 97; 329/310; 371/43; 307/353; 328/151

[56] References Cited

U.S. PATENT DOCUMENTS

| | | | |
|---|---|---|---|
| 3,409,831 | 11/1968 | Walker | 375/52 |
| 4,370,748 | 1/1983 | Janc et al. | 375/95 |
| 4,403,333 | 9/1983 | Gupta | 375/94 |

*Primary Examiner*—Curtis Kuntz
*Assistant Examiner*—T. Ghebretinsae
*Attorney, Agent, or Firm*—Elmer Galbi

[57] ABSTRACT

Bit synchronization is achieved by identifying potential bit sample points and assigning corresponding weight values as a function of signal noise vulnerability. The greater the possibility of error due to signal noise, the smaller the assigned weight value. The bit sample points associated with the largest accumulated weight value are taken as the appropriate data sample points for extracting information from the data signal. For a duobinary signal, zero crossings are identified as potential bit sample points and assigned a weight value corresponding to signal slope thereat. The number of possible bit sample points associated with each actual bit sample point is limited to a finite set by phase locking the carrier signal to the data rate.

15 Claims, 4 Drawing Sheets

DATA BIT SYNCHRONIZATION

The present invention relates to communication systems and particularly to a method and apparatus for data bit synchronization.

BACKGROUND OF THE INVENTION

Digital data transmissions typically provide data in bit serial fashion. The data transmission may be divided into data frames or words with preambles or flags identifying certain data segments. To accurately detect such frames, words and preambles, or obtain any information from the data transmission, however, a receiver must first establish bit level synchronization. The remote receiver must determine precisely when the transmission should be sampled to obtain a sequence of valid data bit values. Valid bit sample points are separated by known time intervals so the task of bit synchronization requires identification of one at least valid bit sample point as a time reference, with subsequent samples taken according to the known separation between bit sampling points. If an incorrect bit sampling point is identified, subsequent sampling of the transmission yields data more susceptible to noise and therefore less likely to be valid.

In some transmission protocols a separate bit sample clock establishes a time reference identifying bit sampling points. According to such transmission protocols, a receiver must monitor both a data signal and a time reference signal for use as a bit sample clock. Bit synchronization is achieved by sampling the data signal in response to the bit sample clock. This method requires tight synchronization between the bit sample clock and the data signal. If the bit sample clock varies relative to the data signal, then information extracted from the data signal is more likely to be invalid.

If a separate bit sample clock is not available, other methods of bit synchronization can be used. A receiver can monitor the data signal and, based on detected characteristics of the data signal, generate an internal bit sample clock. For example, by identifying state transitions in the data signal it is possible to derive an internal bit sample clock as a time reference. Such a method requires, however, clearly identifiable signal transitions for accurate time reference. Without readily identifiable signal transitions, additional signal processing steps may be required to reconstruct such transitions. Unfortunately, signal noise often affects the determination of bit sample points based on measurement of the data signal and suitable data sample points are not obtained.

Rapid bit synchronization may be required in some transmission protocols. For example, in a time multiplexed system where a battery powered remote receiver activates to monitor a data signal during an assigned time slot, rapid bit synchronization conserves battery power because overall receiver activation time is reduced. Generally, however, bit synchronization by reference to the data signal alone, i.e. without an external bit sample clock, is more accurately achieved over a relatively long sampling period, and remains subject to error due to signal noise.

Accordingly, it would be desirable to provide a bit synchronization method less affected by signal noise to avoid invalid data recovery, and more rapidly established to conserve battery power.

SUMMARY OF THE INVENTION

The present invention provides reasonably fast bit synchronization without an external bit sample clock for determining bit sample points and without substantial susceptibility to signal noise.

Bit synchronization in accordance with the present invention identifies potential bit sample points and weights each identified potential bit sample point based on the vulnerability of the data signal to noise in the vicinity of each potential bit sample point. By assigning larger weight values to potential bit sample points less vulnerable to noise, potential bit sample points associated with the greatest accumulated weight are selected as a time reference for extracting bit values from the data signal.

In accordance with one aspect of the present invention, as applied to a duobinary data signal having data sample points at zero crossings, potential bit sample points identified as baseband zero crossings are assigned a weight value as a function of adjacent signal values characterizing the data signal as to its noise vulnerability. The weighting function can, for example, simply assign the magnitude of a difference between two data signal values near a detected zero crossing, indicating the slope of the data signal near the zero crossing and, therefore, a gross representation of the noise vulnerability of the location of the zero crossing. A more complicated weighting function more closely correlated to the actual probability of noise error in the vicinity of the potential sample points provides more rapid and accurate bit synchronization.

In accordance with another aspect of the present invention, bit synchronization is facilitated by phase locking the carrier signal to the data sampling points whereby a receiving device can phase lock its sampling function to the recovered carrier of the resulting modulated transmission and associate each sample to one of a finite number of subsets. In this manner the task of bit synchronization is accomplished by selecting one of the subsets as containing the valid bit sample points.

DETAILED DESCRIPTION

Figure 1:
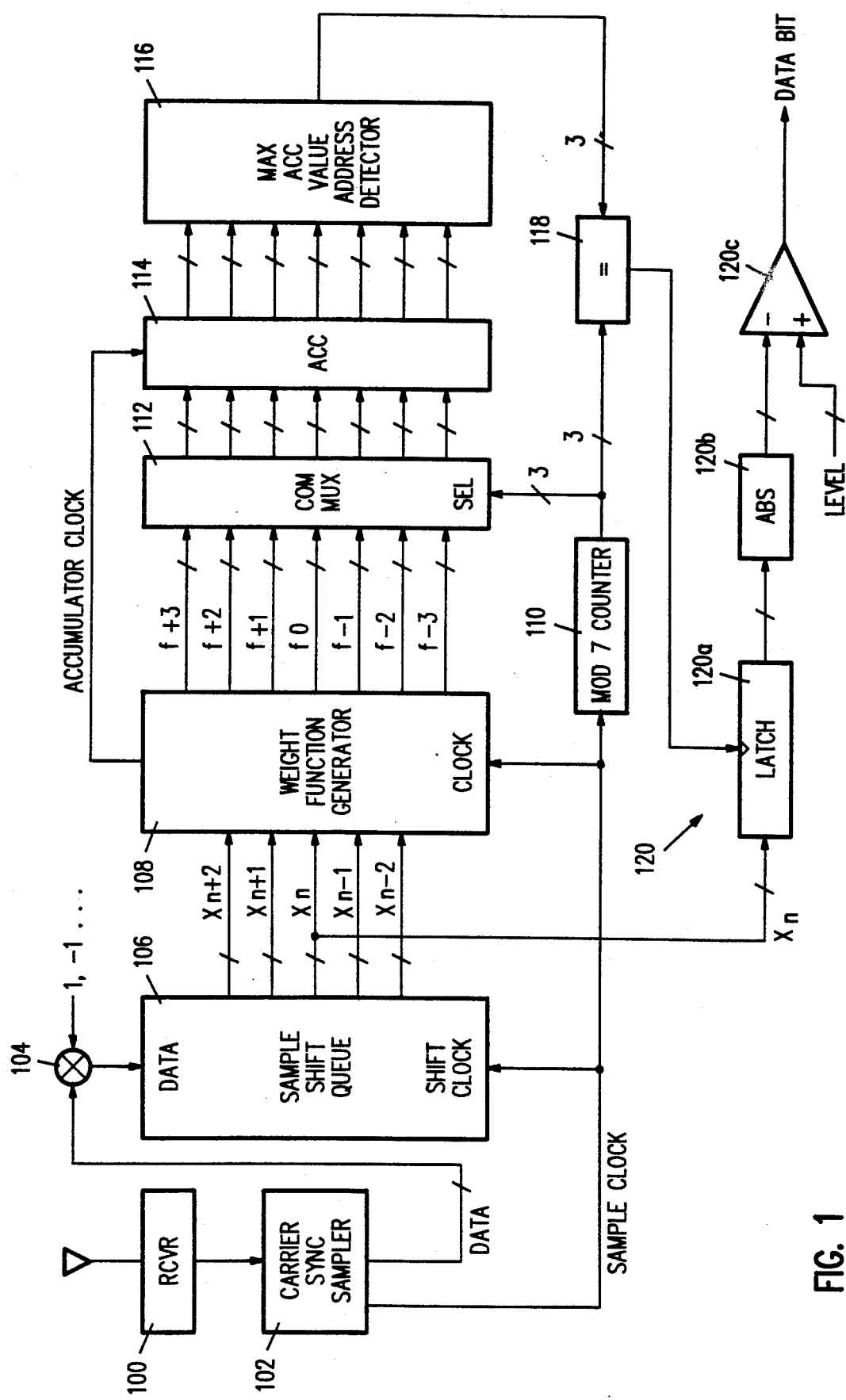
FIG. 1 is a block diagram of an apparatus for data bit synchronization in accordance with the present invention.

FIG. 1 is a block diagram of a radio signal receiving device performing bit synchronization in accordance with the present invention. The particular embodiment of the present invention described herein is adapted to establish bit synchronization relative to a duobinary data signal transmitted by the amplitude modulation of a carrier signal. An example of a system that transmits such a signal is shown in U.S. Pat. No. 4,713,808 (Gaskill). It will be understood, however, that the present invention may be applied to other types of data signals and transmission media.

Figure 2:
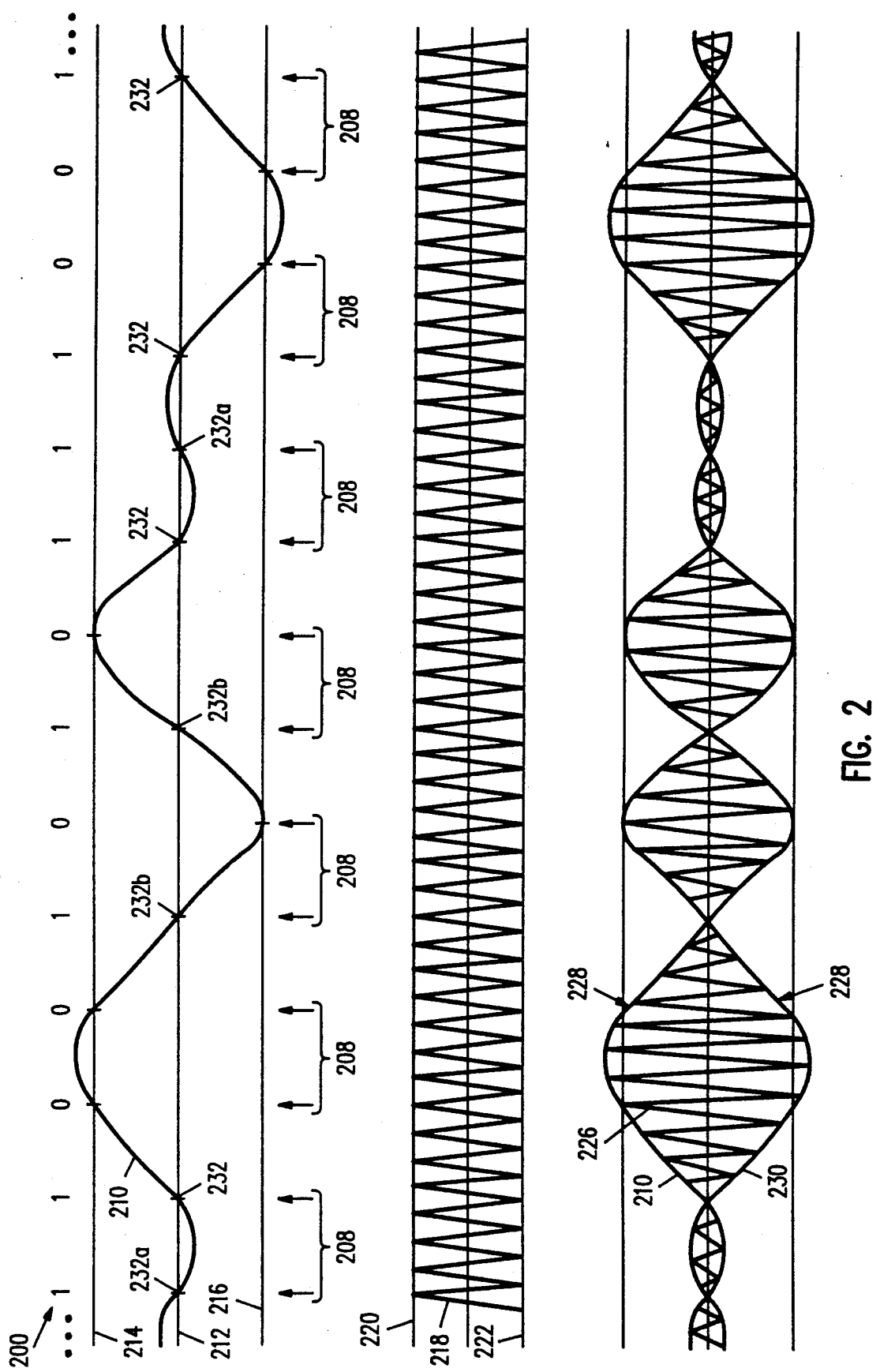
FIG. 2 illustrates a data bit sequence and signals associated with transmission of the data bit sequence by radio signal.
Figure 3:
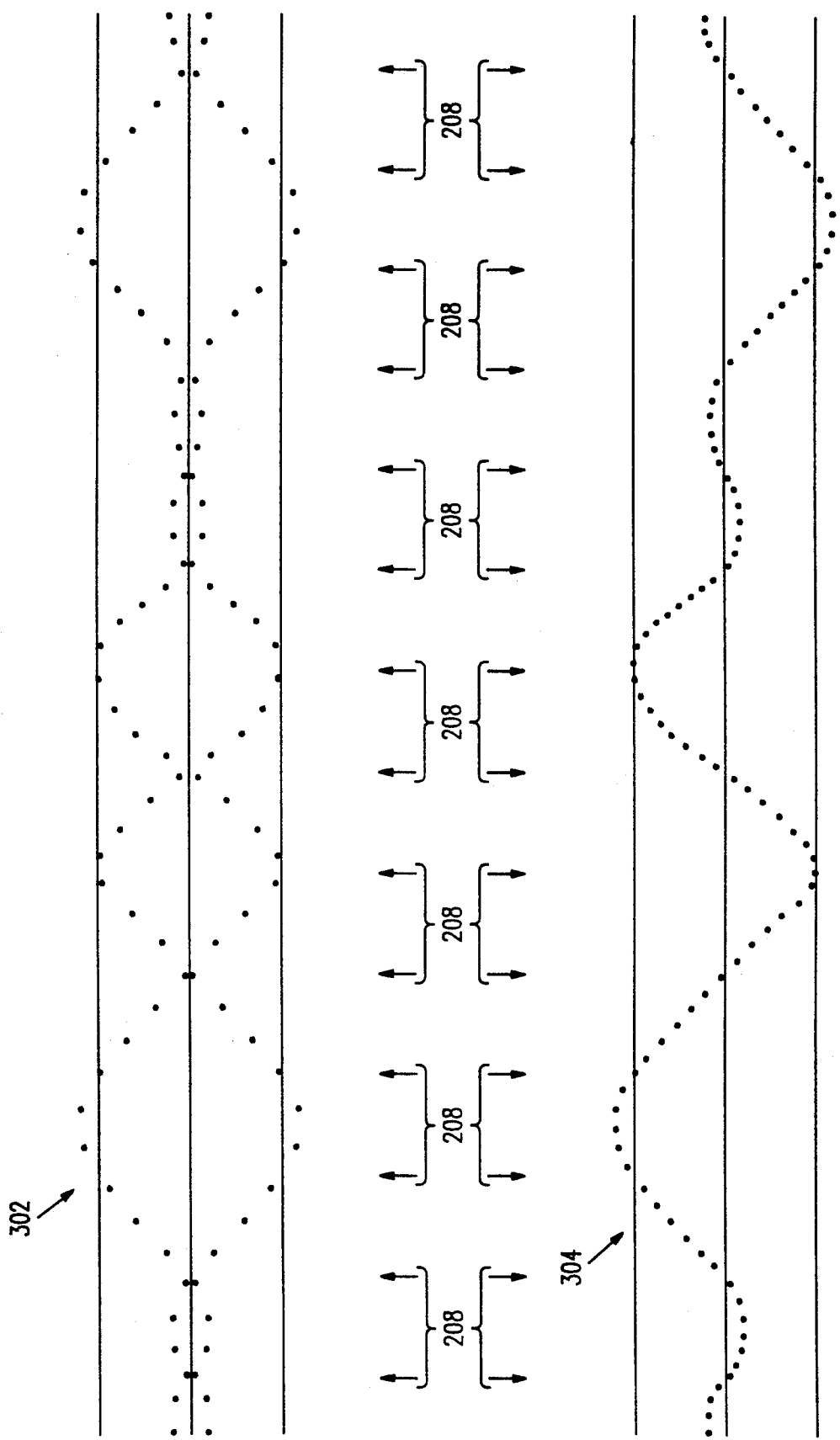
FIG. 3 illustrates processing of the transmission signal of FIG. 2 by the apparatus of FIG. 1.

In FIGS. 1, 2 and 3 a radio receiver 100 monitors a given radio frequency and delivers a modulated carrier signal 226 to a carrier synchronized sampler 102. Sampler 102 phase locks to the modulated carrier signal 226 to produce a sequence of digital data values and an associated SAMPLE CLOCK indicating presentation of each data value in the sequence. The data sequence provided by sampler 102, illustrated as the sequence 302, represents voltage levels of a carrier signal envelope, i.e. the amplitude of the modulated carrier signal sampled at the peak positive and negative excursions of the carrier 218. This is traditionally done with circuits such as phase locked loops or Costas loops. The data sequence 302 provided by sampler 102 generally alternates between positive and negative values. As explained in greater detail below, multiplier 104 multiplies every other datum taken from sampler 102 by the value negative one. The resulting sequence of data values, illustrated as the sequence 304, represents either the original duobinary baseband signal 210 or its complement 230, either of which may be used to recover the desired data. In the present example, multiplier 104 delivers data value sequence 304 as voltage values representing points along the duobinary baseband signal 210.

A sample shift queue 106 receives the data value sequence 304 from multiplier 104. Queue 106 makes available consecutive values of data value sequence 304 such that each sample datum may be evaluated in the context of adjacent sample values. Accordingly, queue 106 provides to weight function generator 108 five consecutive sample values, designated $X_{n+2}$, $X_{n+1}$, $X_n$, $X_{n-1}$ and $X_{n-2}$, taken from sequence 304.

Weight function generator 108 identifies data values representing zero crossings of the duo-binary baseband signal 210 in order to identify potential bit sample points. For a duobinary baseband signal 210, zero crossings coincide with bit sample points 208. Generator 108 determines whether a data value, i.e. $X_n$, is at or near a zero crossing. For a given $X_n$ identified as potentially corresponding to a bit sample point 208, i.e. detected as being at or near a zero crossing, generator 108 examines the data values preceding the given $X_n$, i.e. $X_{n-1}$ and $X_{n-2}$, and the data values following the given $X_n$, i.e. $X_{n+2}$, and $X_{n+1}$, to characterize the signal as to noise vulnerability of the zero crossing in the vicinity of the given sample $X_n$.

One way to determine noise vulnerability for a duobinary signal is to look at the slope of the signal. If the signal slope is relatively small, noise is more likely to corrupt the location of the zero crossing. If the signal slope is relatively large, however, noise is less likely to affect the location of a zero crossing. Greater weight is given to samples identified as potentially corresponding to sample points 208 which are less vulnerable to signal noise. A suitable weight value $f_0$ is then generated for the given $X_n$ based on its noise vulnerability, more particularly the probability that the zero crossing occurred at $X_n$. Additional weight values $f_{+3}$, $f_{+2}$, $f_{+1}$, $f_{-1}$, $f_{-2}$ and $f_{-3}$ may be generated for signal values surrounding the $X_n$ identified as being a probable location of a zero crossing. Generally, however, these additional weight values can be zero.

As explained more fully hereafter, by phase locking the carrier signal to the bit sample points 208 at the time of transmission, the value of the duo-binary baseband signal 210 at each bit sample point 208 is contained in one of a finite number of identifiable subsets of the data value sequence 304 provided by sampler 102 and multiplier 104. In the present case, for example, it is known that valid bit sample points 208 occur at every seventh datum in the sequence of data values 302 provided by sampler 102. Thus, bit synchronization is reduced to the selection of one subset out of seven as being the subset which contains the values of the duobinary baseband signal 210 at the bit sampling points 208. A modulo seven counter 110 responds to the SAMPLE CLOCK generated by sampler 102 to associate each data value with one of the seven subsets, with one such subset corresponding to the set of valid bit sample points 208. The output of counter 110 is applied to the select input of a commutating multiplexer 112 to route weight values from generator 108 to the appropriate accumulators of a seven element weight value accumulator 114.

The function of accumulator 114 is to collect the weight values $f_{+3}$, $f_{+2}$, $f_{+1}$, $f_0$, $f_{-1}$, $f_{-2}$, and $f_{-3}$ as generated by generator 108 and routed by commutating multiplexer 112, with a separate accumulator associated with each subset of data value sequence 304. The accumulators of accumulator 114 can simply be registers adapted to accept and add weight values. In such case the registers should be of sufficient size to hold the necessary total sum of weight values, possibly with maximum and minimum value limitation to prevent overflow. In the preferred embodiment, however, the accumulators of accumulator 114 are implemented as infinite impulse response (IIR) filters to prevent overflow while accurately preserving the relative relationship between the accumulated weight values.

The maximum accumulator value address detector 116 monitors the contents of each accumulator of accumulator 114 and provides the address of the accumulator holding the largest value. The address of this maximum valued accumulator corresponds to the subset of sample points having the greatest accumulated weight value, and therefore the subset with the highest probability of containing the values of the duo-binary baseband signal 210 at the bit sample point 208. Comparator 118 compares the address provided by detector 116 with the output of counter 110 to clock a bit evaluation circuit 120 every time data value $X_n$ corresponds to the address provided by detector 116. Every time a valid bit sample, as determined in accordance with the present invention, is stored as value $X_n$ in queue 106, circuit 120 produces the corresponding bit value. More particularly, comparator 118 clocks latch 120a to capture the current value $X_n$ which is in turn applied to an absolute value function 120b. A comparator 120c receives the absolute value of $X_n$ for comparison to a LEVEL datum establishing a boundary between logic "1" and logic "0". The output of comparator 120c provides a DATA BIT corresponding to the value $X_n$. Thus, circuit 120 produces a logic "1" bit value for $X_n$ values near zero volts and logic "0" bit value for larger magnitude $X_n$ values, i.e., for values greater than the LEVEL datum.

FIG. 2 illustrates data signals associated with transmission of a bit sequence 200, comprising the bit values " . . . 11001010111001 . . . ". A duo-binary baseband signal 210 represents the bit sequence 200 with a zero volt level 212 corresponding to a logic "1" value, and a positive volt level 214 and a negative volt level 216 of signal 210 each, corresponding to a logic "0" value. Generating a duo-binary baseband signal 210 representing bit sequence 200 is well known and will not be discussed here.

By sampling duo-binary baseband signal 210 at sample points 208, bit sequence 200 may be recovered where a measurement of close to zero volts corresponds to a logic "1" and measurement of a given magnitude, i.e. positive or negative voltage, at or near voltage levels 214 and 216 corresponds to a logic "0" value. Furthermore, zero crossings 232 of duo-binary baseband signal 210, i.e., transitions through voltage level 212, are known to correspond to sample points 208. Because sample points 208 are uniformly spaced at known intervals, identifying one of the sample points 208 provides a basis for sampling duo-binary baseband signal 210 to derive bit sequence 200.

The susceptibility of zero crossing location to noise may be determined by the slope of duo-binary baseband signal 210. For example, zero crossing points 232a correspond to relatively flat regions of duo-binary baseband signal 210 where signal noise is more likely to corrupt a measurement, i.e. result in an incorrect position of a zero crossing. On the other hand, zero crossing points 232b correspond to a relatively steeper portions of duo-binary baseband signal 210 where signal noise will affect the position of the zero crossing to a lesser degree. All zero crossing points may be identified as potential bit sample points, but zero crossing points 232b are given greater weight because such are less vulnerable to signal noise and therefore more likely to be a correct time reference for data bit sampling.

To provide bit sequence 200 by radio transmission, duo-binary baseband signal 210 is used to amplitude modulate a higher frequency carrier signal 218. Carrier signal 218 is bounded by a positive voltage level 220 and negative voltage level 222 equal in magnitude. When carrier signal 218 is multiplied, i.e., amplitude modulated, by duo-binary baseband signal 210, a transmission signal 226 results. The average frequency of transmission signal 226 matches the frequency of carrier signal 218, but its amplitude corresponds to the amplitude of duo-binary baseband signal 210. Accordingly, transmission signal 226 is bounded by an envelope 228 defined by duo-binary baseband signal 210 and by its complement 230, i.e., by the reflection of signal 210 across zero voltage level 212.

The frequency of carrier signal 218 is a multiple of one-half the bit rate of duo-binary baseband signal 210. Also, carrier signal 218 is phase locked to the data sample points 208 of duo-binary baseband signal 210 whereby sample points 208 correspond to a known set of phases of the carrier, in this embodiment to maxima, i.e., phase equal to 0 or $\pi$, of carrier signal 218. Accordingly, the carrier signal 218 traverses a known number of half cycles between each data sample point 208. If the carrier signal 218 is phase locked to the data sample points 208 and this phase relationship is known, the receiving device of FIG. 1 need only select one subset among a finite number of subsets of the data value sequence 304 as the valid data sample points in transmission signal 226.

In the illustrated example of FIG. 2, carrier signal 218 traverses three and one half cycles for each data point 208. Possible bit sample points in transmission signal 226, i.e. the values of sequence 302 or sequence 304, occur, therefore, at phase values 0 and $\pi$ of carrier 218 of the transmission signal 226. Sampler 102 is adapted to phase lock to the carrier 218 of the transmission signal 226 and provide the sequence of data values 302 corresponding to voltage levels of signal 226 at carrier maxima, i.e. phase values 0 and $\pi$. Thus, each cycle of carrier signal 218 presents two possible bit sample points or data values in the sequence 304. With three and one half cycles in carrier signal 218 for each bit sample point 208, the sample points 208 correspond to the data values in one of the seven possible subsets of data value sequence 304 generated from signal 226.

The data sequence 302 of FIG. 3 as provided by sampler 102 thereby represents the envelope 228 of transmission signal 228. The values of sequence 302 generally alternate between positive and negative values, i.e. between the values of duo-binary baseband signal 210 and its complement 230. The present invention could be applied to the sequence 302, however, for the purpose of clarity, the sequence 302 is applied to the multiplier 104 to derive a representation of the duo-binary baseband signal 210. More particularly, by multiplying at multiplier 104 every other value of sequence 302 by the value negative one, the baseband duo-binary baseband signal 210 or its complement 230 is obtained.

Thus, all potential bit sample points in transmission signal 226, particularly the sequence 304 of FIG. 3, fall into one of seven subsets as determined by modulo seven counter 120. Because only one of the seven subsets corresponds to sample points 208, identifying the correct subset provides a basis for sampling the data value sequence 304 to extract bit sequence 200.

As described above, weight function generator 108 monitors possible bit sample points of the sequence 304 as provided by shift queue 106. When the value designated as $X_n$ is determined to be at or near a zero crossing, i.e. potentially a valid bit sample point, generator 108 examines values surrounding the value $X_n$ to derive a weight function based on the vulnerability of the signal to noise in the vicinity of value $X_n$.

Figure 4:
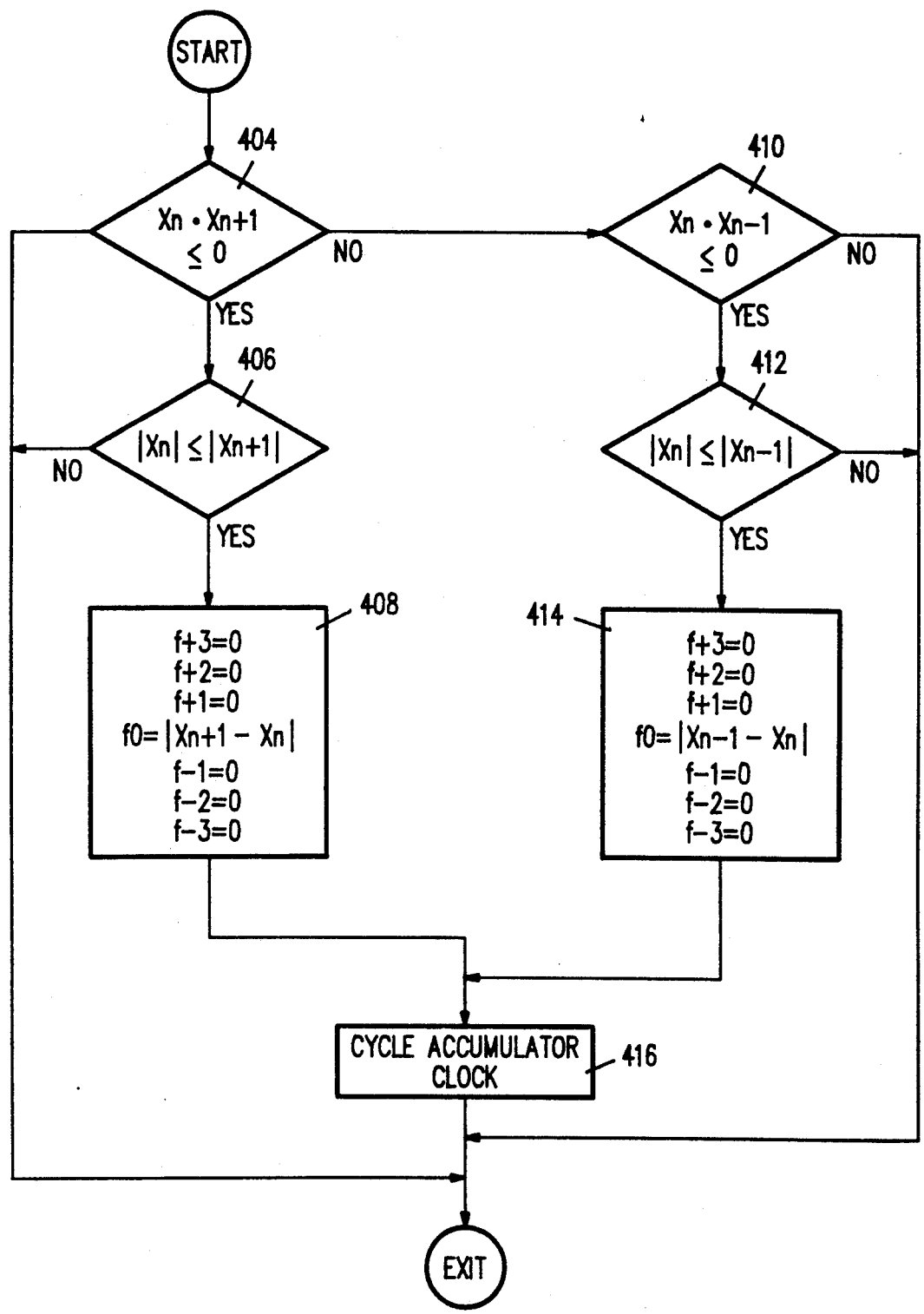
FIG. 4 is a flow chart illustrating operation of the apparatus of FIG. 1.

FIG. 4 illustrates control flow for generator 108 using signal slope as a weight function indicating signal vulnerability to noise. The steps illustrated in FIG. 4 occur on each cycle of the SAMPLE CLOCK provided by sampler 102. In decision block 404, generator 108 determines if the product of $X_n$ and $X_{n+1}$ is less than or equal to zero. If the signs of $X_n$ and $X_{n+1}$, are opposite, indicating a zero crossing between $X_n$ and $_{n+1}$, or if the product equals zero, indicating one of the operands is a zero crossing, processing branches to decision block 406. The next step is to determine which of the values $X_n$ and $X_{n+1}$ is closer to the detected zero crossing. In block 406, generator 108 tests whether the absolute value of $X_n$ is less than or equal to the absolute value of $X_{n+1}$, indicating $X_n$ as being closer to the detected zero crossing. An affirmative result in decision block 406 causes generator 108 to branch to block 408 where the weight function $f_0$ is set to the absolute value of $X_{n+1}$ minus $X_n$, the slope magnitude of the duobinary baseband signal 210 near the sample $X_n$. Also, in block 408, the weight values $f_{+3}$, $f_{+2}$, $f_{+1}$, $f_{-1}$, $f_{-2}$ and $f_{-3}$ are set to zero. A negative result in decision block 406 causes generator 108 to exit the current cycle.

A negative result in block 404 causes generator 108 to branch to decision block 410 where a similar test compares $X_n$ and $X_{n-1}$ to detect a zero crossing. More particularly, if the product of $X_n$ and $X_{n-1}$ is less than or equal to zero, indicating opposite signs or an operand equal to zero, then processing continues to decision block 412. If a zero crossing is not detected in block 410, i.e. a negative result, generator 108 exits. In block 412, if the absolute value of $X_n$ is less than or equal to the absolute value of $X_{n-1}$, indicating $X_n$ as being closer than $X_{n-1}$ to the detected zero crossing, the weight function $f_0$ is set in block 414 to the absolute value of $X_{n-1}$ minus $X_n$, the slope magnitude of the signal near $X_n$. The other weight values $f_{+3}$, $f_{+2}$, $f_{+1}$, $f_{-1}$, $f_{-2}$ and $f_{-3}$ are set to zero in block 414. A negative result in block 412 causes generator 108 to exit.

If processing reaches either of blocks 408 or 414, a zero crossing at or near $X_n$ has been detected and suitable weight values have been generated. Processing continues from either of blocks 408 or 414 to block 416 where generator 108 cycles the ACCUMULATOR CLOCK triggering accumulator 114 to accept and process the calculated weight values $f_{+3}, f_{+2}, f_{+1}, f_0, f_{-1}, f_{-2}$, and $f_{-3}$ then available by way of commutating multiplexer 112.

Once the device of FIG. 1 is activated and a number of zero crossings have been detected, bit synchronization is quickly achieved by selecting the subset with the greatest accumulated weight value as corresponding to the bit sample points 208. The number of detected zero crossings needed to establish bit synchronization will vary depending on particular signal characteristics and data content. For example, for a duobinary data signal sending a synchronization preamble alternating between logic "1" and logic "0", many zero crossings with steep signal slope are provided. Such a synchronization preamble, while not essential, would provide rapid bit synchronization.

Several techniques may be used to conclude the process of bit synchronization. Bit synchronization may be assumed to be complete after a given time interval following activation of the device of FIG. 1. The number of detected zero crossings, as indicated by the number of times the ACCUMULATOR CLOCK is cycled by generator 108, could be used to determine when bit synchronization is assumed to be established. Also, the detector 116 may be adapted to compare the values held in the accumulators of accumulator 114 and provide a termination signal (not shown) when, for example, one value is substantially greater then other values. When it is determined that bit synchronization is achieved, the ACCUMULATOR CLOCK may be gated to disable accumulator 114 thereby stabilizing the output of detector 116 and maintaining the currently selected bit sample point.

The device of FIG. 1 could also be adapted to run continuously, always monitoring zero crossings and calculating weight values, even after initial bit synchronization. This would be required if there were no synchronization of the carrier 210 to the bit sample points 208 causing the subset selection to change over time. In such case, it would be necessary to avoid accumulator overflow and to reduce the accumulated weights over time by, for example, implementing the accumulators of accumulator 114 as infinite impulse response (IIR) filters.

The weight values applied to a given sample $X_n$ and its neighbors $X_{n-1}, X_{n+1}, X_{n-2}, X_{+2}, \ldots$ etc. can be a function of any sequence of values preceding the given potential sample point and any sequence of values following the given sample $X_n$. Thus, the general form of the weighting functions $f_m$ is:

$$f_m (X_{n-j} \ldots X_n \ldots X_{n+k})$$

where $X_n$ represents a signal value taken at a sample point indicated by subscript n, and where j and k indicate the number of sample values preceding and following, respectively, the sample $X_n$. For example, the slope magnitude of the signal near a sample $X_n$ could be calculated in blocks 408 and 414 of FIG. 4 as:

$$f_0 = abs((X_{n-1}) - (X_{n+1}))$$

This form of the weight function encompasses a larger segment of the signal and gives more weight to extended steep portions of the data signal. It will be appreciated that the slope magnitude calculation could be based on a larger segment of data values.

Also, the additional weight functions $f_{+3}, f_{+2}, f_{+1}, f_{-1}, f_{-2}, f_{-3}$ may be provided with nonzero values under certain circumstances. For example, when the calculated slope magnitude of the data signal near an identified sample $X_n$ is particularly large, indicating that $X_n$ is very likely to coincide with a valid sample point 208, the weight values for samples surrounding $X_n$ could be discounted. Processing in, for example, block 408 of FIG. 4 may take the form:

$$f_0 = abs((X_{n-1}) - (X_{n+1}))$$
if $f_0$ > STEEP_SLOPE
then
{
$f_{+3}$ = DISCOUNT_3
$f_{+2}$ = DISCOUNT_2
$f_{+1}$ = DISCOUNT_1
$f_{-1}$ = DISCOUNT_1
$f_{-2}$ = DISCOUNT_2
$f_{-3}$ = DISCOUNT_3
}
else
{
$f_{+3} = 0$
$f_{+2} = 0$
$f_{+1} = 0$
$f_{-1} = 0$
$f_{-2} = 0$
$f_{-3} = 0$
} where STEEP_SLOPE corresponds to a threshold slope magnitude for triggering reduction of adjacent weight values, and DISCOUNT_1, DISCOUNT_2, and DISCOUNT_3 are negative values used to reduce adjacent accumulated weight values.

It will be appreciated by those skilled in the art that a great number of various weighting function calculations are possible depending on particular signal characteristics and signal processing hardware available.

While the illustrated weighting function, based on the slope magnitude of the duobinary signal, serves its intended purpose of identifying suitable bit sample points for bit synchronization, more accurate weighting functions may be provided for faster bit synchronization. A desired weight value may not be directly proportional to the signal slope magnitude because the probability of noise error is not always directly proportional to signal slope of the region surrounding the data samples. A weight value greater than signal slope could be given to such steep slope data points to more quickly achieve bit synchronization. For example, consider the following weight functions:

$$f_0 = a(X_{n+1})^2 a(X_{n-1})^2 - b(X_n)^2$$

$$f_0 = a[(X_n - X_{n-1})^2 + (X_n X_{n+1})^2] + b[(X_n - X_{n-2})^2 + (X_n X_{n+2})^2]$$

According to these functions, the resulting weight value can be much greater than signal slope magnitude near the detected zero crossing, i.e. not merely proportional the signal slope, and are believed to more accurately reflect the probability of error due to noise. Weighting functions based only on signal slope, however, are considered adequate and, depending on signal characteristics, preferred due to their simplicity and ease of implementation.

Thus an improved method and apparatus for bit synchronization has been shown and described. In accordance with the present invention, the possibility of error due to noise is accounted for in determining suitable bit sample points to achieve reasonably fast yet accurate bit synchronization.

I claim:

1. A method of extracting information from a modulated carrier signal by measurement of said modulated carrier signal at data sample points, the method comprising:
   sampling said modulated carrier signal to identify potential data sample points;
   weighing each identified potential data sample point as a function of a probability of noise error in the vicinity of the identified potential data sample point;
   selecting for measurement data sample points based on weighing values or corresponding identified potential data sample points; and
   extracting said information from said modulated carrier signal by measurement relative to said selected data sample points.

2. The method according to claim 1 wherein said modulated carrier signal corresponds to a polybinary data signal and said recited step of sampling to identify potential data sample points comprises sampling to identify datum corresponding to a given voltage level of said modulated carrier signal.

3. The method according to claim 2 wherein said polybinary signal is a duo-binary signal.

4. The method according to claim 1 wherein said weighting step comprises generating said weighting function based on data signal slope magnitude.

5. In a radio communication system, wherein a modulated data signal representing a data bit sequence and having a predetermined bit rate is generated, wherein a carrier signal having a frequency greater than said modulated data signal and a predetermined phase relation to said bit rate is generated, whereby a known number of carrier signal cycles may be associated with each data bit represented in said modulated data signal, wherein a radio signal is generated, said radio signal being generated by modulation of said carrier signal by said data signal, and wherein said radio signal is broadcast, the method comprising,
   receiving at a receiver said radio signal and phase locking to said carrier to generate a modulated carrier signal which has an envelope; and
   periodically sampling said modulated carrier to recover said data bit sequence, said sampling being done periodically at a sample time which is adjusted so that the slope of said envelope is a maximum at said sample time.

6. The method according to claim 5 wherein the frequency of said carrier signal is a multiple of one half the bit rate of said bit sequence as represented by said modulated data signal.

7. The method according to claim 5 wherein said modulated data signal is a polybinary signal amplitude modulated to represent said bit sequence.

8. The method according to claim 7 wherein said polybinary signal is a duobinary signal.

9. The method according to claim 5 wherein said periodically sampling step comprises maintaining weight function accumulators corresponding to each data bit sequence, associating each datum in said data sequence with one of said accumulators, calculating a weight function for each datum in said data sequence identified as a potential data sample point, accumulating each calculated weight value in the associated accumulators, and selecting as said data sample points ones of said data sequence corresponding to one of said accumulators based on the accumulated weight value stored therein.

10. The method according to claim 9 wherein said step of calculating a weight function for each datum in said data sequence identified as a potential data sample point comprises calculating a signal slope magnitude.

11. An apparatus for recovering a bit sequence from a radio transmission signal having identifiable points therein, said transmission signal comprising a carrier signal phase locked to a bit rate of a baseband signal such that a limited number of said identifiable points of said transmission signal correspond to each data bit in said bit sequence, the apparatus comprising:
   a receiver adapted to monitor said transmission signal and provide a first signal representing said transmission signal;
   a sampler coupled to said receiver and adapted to provide a second signal corresponding to datum at said identifiable points of said transmission signal;
   signal processing means adapted to associate said identifiable points with accumulators corresponding in number to said limited number of identifiable points in said transmission signal, and adapted to recover said bit sequence by using data from one of the said accumulators which corresponds to a bit sample point in said second signal.

12. The apparatus according to claim 11 wherein said identifiable points in said transmission signal correspond to signal maxima.

13. The apparatus according to claim 12 wherein said signal processing means is adapted to select one of said accumulators by sampling said second signal to identify potential bit sample points, weighting each identified potential bit sample point based on calculated signal characteristics, associating each weight value with one of said accumulators, and selecting one of said accumulators based on accumulated associated weight values.

14. The apparatus according to claim 13 wherein said calculated signal characteristics correspond to signal vulnerability to noise.

15. The apparatus according to claim 13 wherein said calculated signal characteristics correspond to signal slope magnitude.

* * * * *